United States Patent
Fornara et al.

(10) Patent No.: US 7,789,372 B2
(45) Date of Patent: Sep. 7, 2010

(54) BUTTERFLY VALVE OF A SWIRL SYSTEM FOR AN INTERNAL COMBUSTION ENGINE

(75) Inventors: Stefano Fornara, Modena (IT); Giampaolo Schiavina, Bologna (IT)

(73) Assignee: Magneti Marelli Powertrain S.p.A. (IT)

( * ) Notice: Subject to any disclaimer, the term of this patent is extended or adjusted under 35 U.S.C. 154(b) by 278 days.

(21) Appl. No.: 11/941,359

(22) Filed: Nov. 16, 2007

(65) Prior Publication Data

US 2008/0149876 A1    Jun. 26, 2008

(30) Foreign Application Priority Data

Nov. 21, 2006    (EP) .................................. 06425789

(51) Int. Cl.
*F16K 1/22* (2006.01)
(52) U.S. Cl. ....................................... 251/308; 123/337
(58) Field of Classification Search ................. 251/305, 251/306, 307, 308; 123/337; 137/15.25
See application file for complete search history.

(56) References Cited

U.S. PATENT DOCUMENTS

| | | | | |
|---|---|---|---|---|
| 1,230,882 A | * | 6/1917 | Filbey ......................... | 251/308 |
| 1,517,335 A | * | 12/1924 | Zinis ........................... | 251/305 |
| 2,529,572 A | * | 11/1950 | Raybould .................... | 251/308 |
| 2,772,850 A | * | 12/1956 | Eaton .......................... | 251/306 |
| 4,213,595 A | * | 7/1980 | Sheppard .................... | 251/308 |
| 4,231,341 A | * | 11/1980 | Kuramoto et al. ........... | 251/306 |
| 4,715,581 A | * | 12/1987 | Myers ......................... | 251/308 |
| 4,836,163 A | * | 6/1989 | Muschalik .................. | 123/337 |
| 4,967,778 A | * | 11/1990 | Ball et al. .................... | 251/305 |
| 6,626,422 B2 | * | 9/2003 | Kaiser ......................... | 251/305 |
| 2004/0031945 A1 | | 2/2004 | Krimmer et al. | |
| 2004/0103882 A1 | | 6/2004 | Kino et al. | |

FOREIGN PATENT DOCUMENTS

| | | | |
|---|---|---|---|
| DE | 200310132185 | A1 | 1/2003 |
| DE | 200510325196 | B3 | 2/2005 |
| EP | 20031371832 | A1 | 12/2003 |
| EP | 20041408216 | A2 | 4/2004 |

* cited by examiner

*Primary Examiner*—John Bastianelli
(74) *Attorney, Agent, or Firm*—Woodcock Washburn LLP

(57) ABSTRACT

A butterfly valve of a swirl system for an internal combustion engine; the butterfly valve displays: a shaft which is rotationally mounted within an intake channel to rotate about a rotation axis; and a butterfly valve plate which is rigidly connected to the shaft and is provided with a seat, which is coaxially arranged with respect to the shaft and accommodates the shaft within itself.

10 Claims, 4 Drawing Sheets

BUTTERFLY VALVE OF A SWIRL SYSTEM FOR AN INTERNAL COMBUSTION ENGINE

TECHNICAL FIELD

The present invention relates to a butterfly valve of a swirl system for an internal combustion engine.

BACKGROUND ART

An internal combustion engine is provided with a number of cylinders, each of which is connected to an intake manifold by means of at least one intake valve and to an exhaust manifold by means of at least one exhaust valve. The intake manifold receives fresh air (i.e. air from the external environment) through a feeding pipe regulated by a butterfly valve and is connected to the cylinders by means of corresponding intake pipes, each of which is regulated by at least one intake valve.

The introduction of a swirl system, which is adapted to vary the section of the intake pipes during engine operation according to the speed of the engine itself (i.e. to the angular revolution speed of the crankshaft), has recently been suggested. At low speeds, the air introduction section through the intake pipes is decreased so as to generate turbulences in the intake air flow which improve the mixing of air and fuel in the cylinders; in virtue of the presence of these turbulences which improve mixing, all the injected fuel is burnt and thus the polluting emissions generated by the combustion are reduced. At high speeds, the introduction section of the air through the intake pipes is maximised so as to allow a complete filling of the cylinders and, thus, to allow the generation of the maximum possible power.

In order to vary the air introduction section through the intake pipes, each intake pipe presents two reciprocally parallel channels, only one of which may be fully closed by a butterfly choke valve. At low speeds, the butterfly choke valves are closed consequently reducing the air introduction section through the intake pipes, while at high speeds the butterfly choke valves are opened to maximise the air introduction section through the intake pipes.

Each butterfly valve comprises a butterfly valve plate fitted onto a shaft, which is rotationally mounted within the intake channel to turn about a rotation axis under the bias of an actuating device. Normally, the butterfly valve plate is welded onto the shaft, e.g. by spot laser welding. If the welding between the shaft and the butterfly valve plate is not perfectly performed, there is the risk that such welding may break in time, mainly due to the high pressures which occur within the intake channel at high speeds. In case of a fracture of the welding between shaft and butterfly valve plate, the butterfly valve plate itself may fall along the intake channel until it reaches the intake valves and thus damage the intake valves themselves.

Consequently, a rigorous inspection of each welding between a shaft and a butterfly valve plate is needed; however, such inspections considerably increase production costs of the butterfly valves of a swirl system.

DISCLOSURE OF INVENTION

It is the object of the present invention to make a butterfly valve of a swirl system for an internal combustion engine, which swirl system is free from the drawbacks described above, easy and cost-effective to manufacture and simple to assemble.

According to the present invention a butterfly valve of a swirl system for an internal combustion engine is made as claimed in the attached claims.

BRIEF DESCRIPTION OF THE DRAWINGS

The present invention will now be described with reference to the accompanying drawings which illustrate a non-limitative example of embodiment thereof, in which.

PREFERRED EMBODIMENTS OF THE INVENTION

Figure 1:
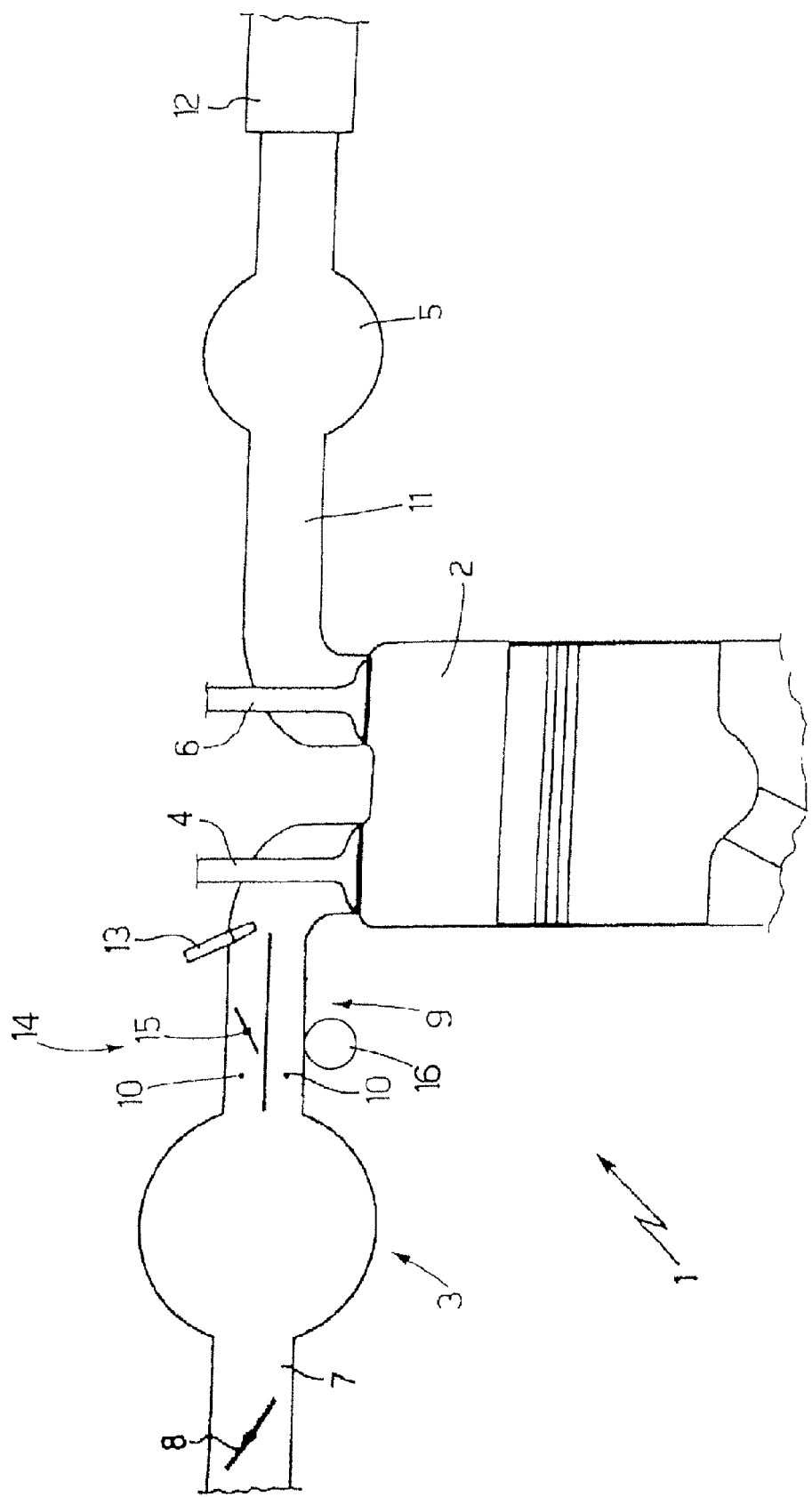
FIG. 1 is a schematic view of an internal combustion engine provided with a swirl system which comprises butterfly choke valves made according to the present invention.

In FIG. 1, numeral 1 indicates as a whole an internal combustion engine provided with four cylinders 2 (only one of which is shown in FIG. 1), each of which is connected to an intake manifold 3 by means of two intake valves 4 (only one of which is shown in FIG. 1) and to an exhaust manifold 5 by means of two exhaust valves 6 (only one of which is shown in FIG. 1).

Intake manifold 3 receives fresh air (i.e. air from the external environment) through a feeding pipe 7 regulated by a butterfly valve 8 and is connected to cylinders 2 by means of corresponding intake pipes 9 (only one of which is shown in FIG. 1), each of which comprises two reciprocally parallel channels 10 and is regulated by corresponding intake valves 4. Similarly, exhaust manifold 5 is connected to cylinders 2 by means of corresponding exhaust conduits 11 (only one of which is shown in FIG. 1), each of which is regulated by corresponding exhaust valves 6; an emission pipe 12, which ends with a muffler (known and not shown) to emit the gases produced by combustion into the atmosphere departs from exhaust manifold 5.

According to a preferred embodiment, the fuel (e.g. petrol, diesel, methane or LPG) is injected within each intake pipe 9 by means of a corresponding injector 13 arranged near corresponding intake valves 4. According to a different embodiment (not shown), injectors 13 are arranged so as to directly inject the fuel within each cylinder 2.

Intake manifold 3 comprises a swirl system 14, which is adapted to vary the introduction section of the air of intake pipes 9 during the operation of engine 1 according to the speed of engine 1 itself. Specifically, swirl system 14 comprises for each intake pipe 9 a choke valve 15, which is mounted along one of the two channels 10 of intake conduit 9 and is adapted to vary the air introduction section through channel 10 itself; specifically, each choke valve 15 is mobile between a closed position in which it fully closes channel 10 and a maximum opening position.

Preferably, swirl system 14 comprises a single actuator device 16 of the electronic or pneumatic type, which simultaneously and synchronously displaces all four choke valves 15. Actuator device 16 comprises an electrical motor (according to a different embodiment, the motor is either pneumatic or hydraulic), which controls the displacement of a bar between two limit positions corresponding to the closed and maximum opening positions of the choke valves 15; the bar is mechanically connected to all four choke valves 15 so as to simultaneously and synchronously displace all choke valves 15 themselves.

Figure 2:
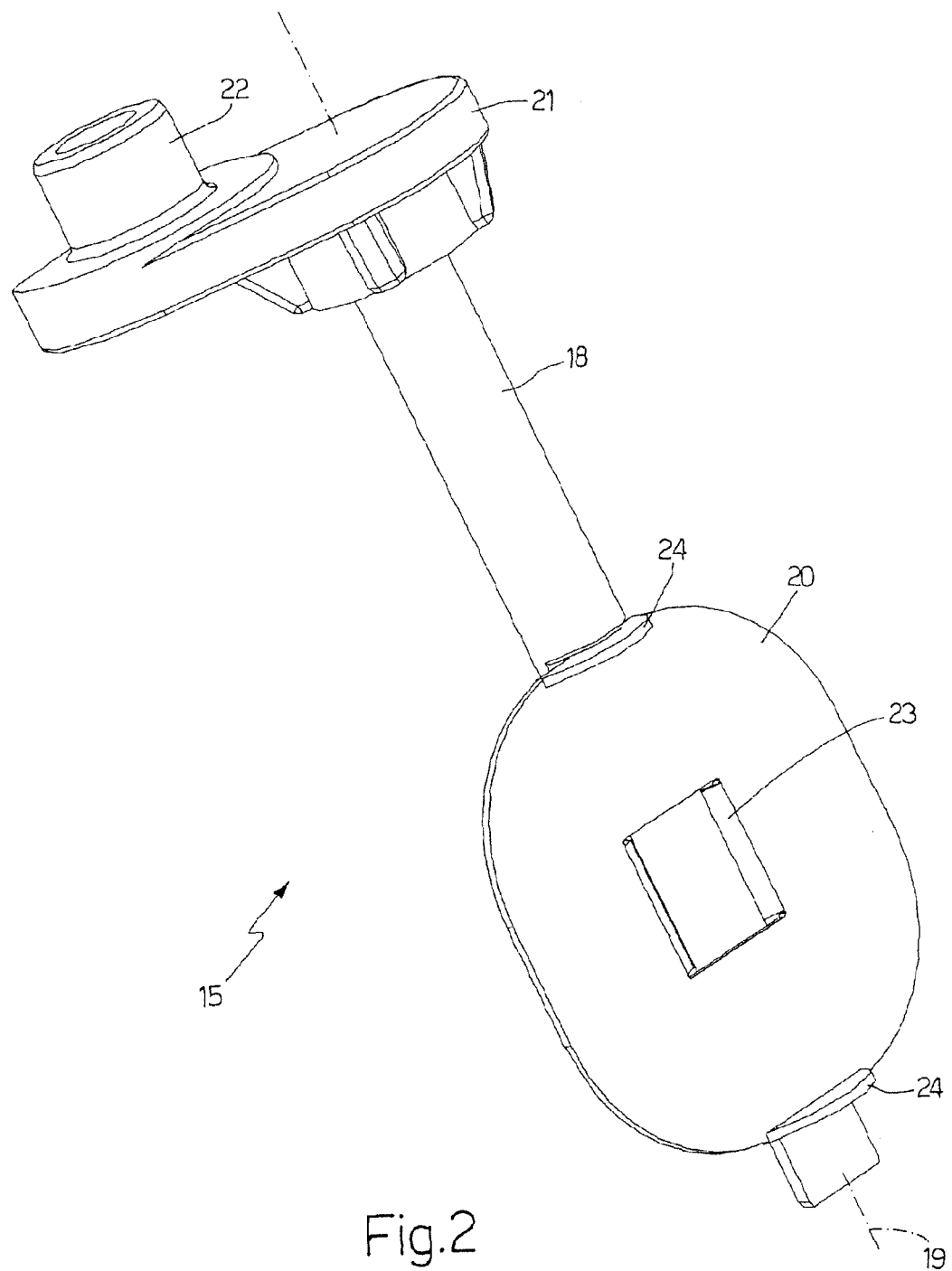
FIGS. 2 and 3 are two perspective views of a part of a butterfly choke valve in FIG. 1.
Figure 3:
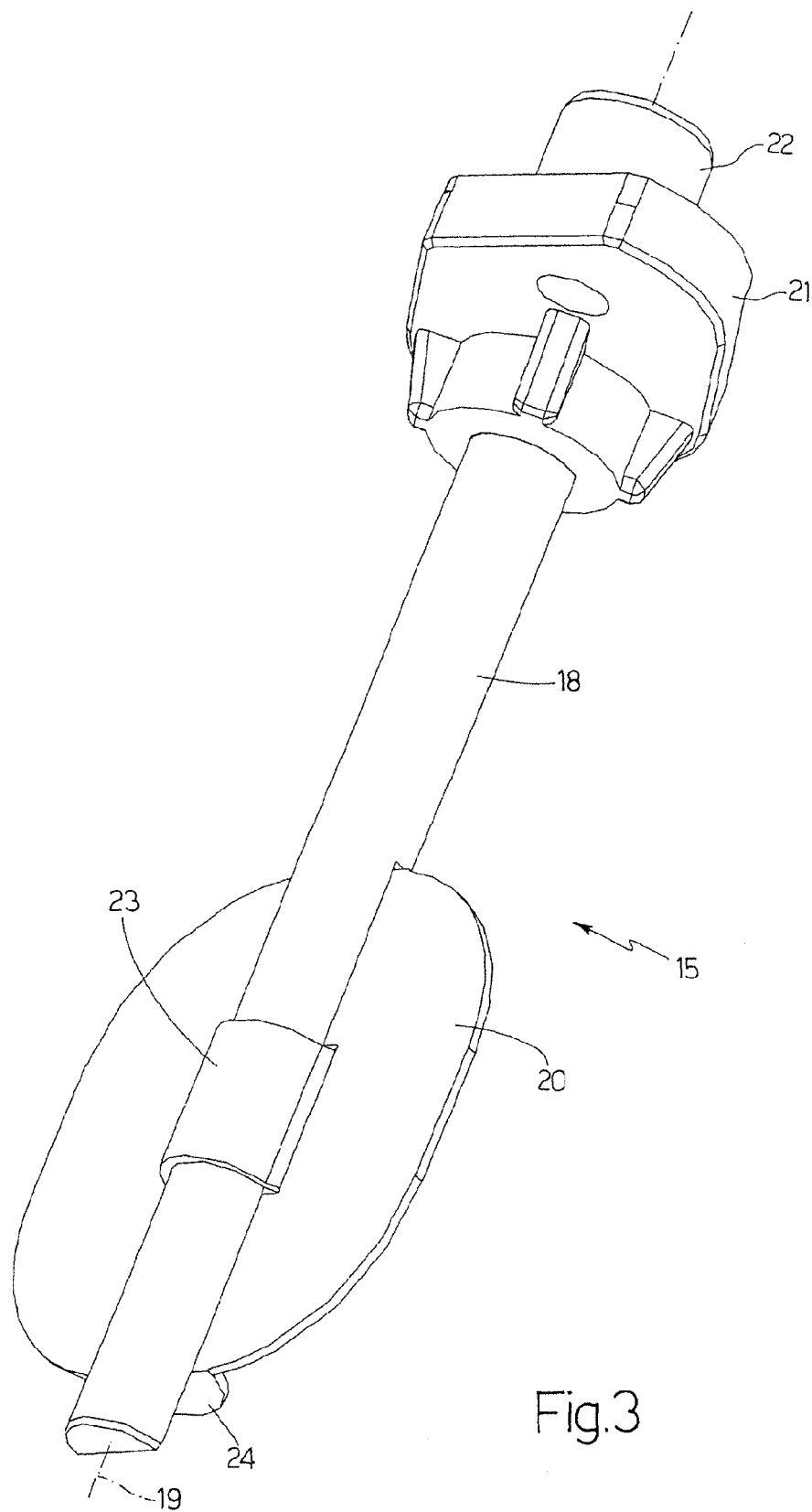
Figure 4:
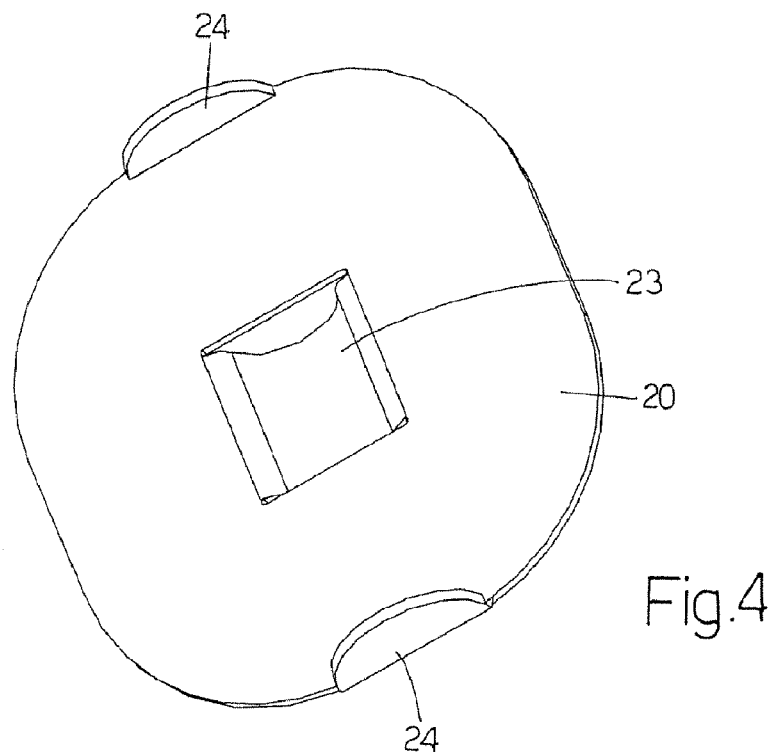
FIGS. 4 and 5 are two prospective views of a butterfly valve plate of the butterfly choke valve in FIGS. 2 and 3.
Figure 5:
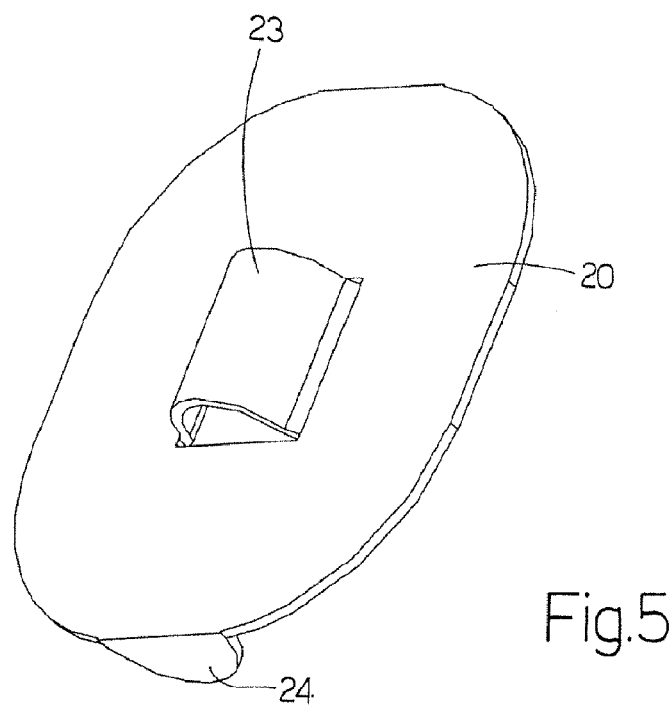

As shown in FIGS. 2 and 3, each butterfly choke valve 15 comprises a shaft 18, which is rotationally mounted about a rotation axis 19 under the bias of actuating device 16 and supports a butterfly valve plate 20 adapted to fluid-tightly close a channel 10 of an intake conduit 9. Preferably, each butterfly valve plate 20 is rigidly connected to shaft 18 by welding; alternatively, each butterfly valve plate 20 may be rigidly connected to shaft 18 by means of screws.

Each butterfly choke valve 15 further comprises a fastening flange 21, which is fitted onto shaft 18 and made integral with shaft 18 itself. Fastening flange 21 displays a connection pin 22, which is eccentrically mounted with respect to rotation axis 19 and achieves the mechanical connection between the bar of actuator device 16 and shaft 18 of butterfly choke valve 15 to transmit motion from actuator device 16 to butterfly choke valve 15 itself.

Each butterfly valve plate 20 comprises a seat 23, which is coaxially arranged with respect to shaft 18 and accommodates shaft 18 within itself. According to a preferred embodiment shown in the accompanying figures, each seat 23 displays a closed semicircular shape; alternatively, each seat 23 could display a centrally open semicircular shape.

The function of each seat 23 is to maintain butterfly valve plate 20 in contact with shaft 18 in case of breakage of the connection (welding or screws) between butterfly valve plate 20 and shaft 18 itself. In this manner, in case of breakage of the connection (welding or screws) between butterfly valve plate 20 and shaft 18, butterfly valve plate 20 remains in contact with shaft 18 and cannot fall along intake channel 10.

Preferably, each butterfly valve plate 20 comprises two centring elements 24, which are perpendicularly arranged with respect to butterfly valve plate 20, display a semicircular shape, and are coaxially arranged with respect to rotation axis 19 at two opposite ends of butterfly valve plate 20.

Each butterfly valve plate 20 is slightly smaller than corresponding intake channel 10 because butterfly valve plate 20 must be free to turn within intake channel 10; furthermore, the difference of dimension between each butterfly valve plate 20 and corresponding intake channel 10 must be such to avoid any mechanical interference also considering the inevitable construction tolerances of butterfly valve plate 20 and of intake channel 10. In some cases, a certain introduction gap between each butterfly valve plate 20 and corresponding intake channel 10 is also required by the engine manufacturer in project specifications.

The dimensional difference described above between each butterfly valve plate 20 and corresponding intake channel 10 normally determines a certain uncertainty about the axial position of butterfly valve plate 20 within corresponding intake channel 10; the function of centring elements 24 is to determine a certain axial position of butterfly valve plate 20 within corresponding intake channel 10.

Preferably, each butterfly valve plate 20 is made by pressing a metal sheet; the manufacturing on each butterfly valve plate 20 of both seat 23 and centring elements 24 is performed at the same time as the pressing of butterfly valve plate 20 from the metal sheet by appropriately shaping the die. Consequently, the manufacturing on each butterfly valve plate 20 of both seat 23 and centring elements 24 is fast and cost-effective and does not imply any increase of cost with respect to a standard butterfly valve plate 20. Specifically, the manufacturing of each seat 23 contemplates to cut butterfly valve plate 20 along at least two cutting lines perpendicularly arranged to rotation axis 19 and to locally deform butterfly valve plate 20 between the two cutting lines.

Subsequently, each shaft 18 is inserted within seat 23 of corresponding butterfly valve plate 20 and butterfly valve plate 20 is rigidly connected to shaft 18 (by welding or by means of screws).

Each butterfly choke valve 15 described above displays a number of advantages, because it allows to maintain butterfly valve plate 20 in contact with shaft 18 in the case of breakage of the connection (welding or screws) between butterfly valve plate 20 and shaft 18 itself. Furthermore, thanks to the presence of centring elements 24, the axial position of butterfly valve plate 20 is determined in a certain manner within corresponding intake channel 10. Finally, the manufacturing of each butterfly choke valve 15 described above is very cost-effective because, as mentioned above, no increase of cost with respect to a standard choke valve 15 is implied.

The invention claim is:

1. A butterfly valve of a swirl system for an internal combustion engine, the butterfly valve comprises:
    a shaft which is rotationally mounted within an intake channel to rotate about a rotation axis; and
    a butterfly valve plate which is rigidly connected to the shaft and comprises:
    a seat, which is coaxially arranged with respect to the shaft and accommodates the shaft within itself, and
    two centering elements, which are perpendicularly arranged with respect to the butterfly valve plate, display a semicircular flat shape, and are coaxially arranged to the rotation axis at two opposite ends of the butterfly valve plate;
    wherein the seat has a semicircular shape while the remaining portion of the butterfly valve plate surrounding the seat is flat; and wherein the portion of the shaft contacting the butterfly valve plate and inserted inside the seat has a semicircular cross section.

2. The butterfly valve of claim 1, wherein the butterfly valve plate is rigidly connected to the shaft by a weld.

3. The butterfly valve of claim 2, wherein the weld is a laser spot weld.

4. The butterfly valve of claim 1, further comprising: a fastening flange fitted onto the shaft.

5. The butterfly valve of claim 4, wherein the fastening flange comprises a connecting pin.

6. The butterfly valve of claim 5, wherein the connecting pin is eccentrically mounted with respect to an axis of the shaft.

7. The butterfly valve of claim 5, wherein the connecting pin is configured to be mechanically connected to an actuator device.

8. The butterfly valve of claim 2, wherein the butterfly valve plate is rigidly connected to the shaft by a screw.

9. The butterfly valve of claim 1, wherein the butterfly valve plate is slightly smaller than a corresponding intake channel.

10. The butterfly valve of claim 1, wherein the butterfly valve plate is a pressed metal sheet.

* * * * *